United States Patent [19]

Takeuchi

[11] Patent Number: 4,947,973
[45] Date of Patent: Aug. 14, 1990

[54] COOLING DEVICE FOR PULL TYPE CLUTCH

[75] Inventor: Hiroshi Takeuchi, Neyagawa, Japan
[73] Assignee: Kabushiki Kaisha Daikin Seisakusho, Neyagawa, Japan
[21] Appl. No.: 369,554
[22] PCT Filed: Aug. 15, 1988
[86] PCT No.: PCT/JP88/00808
  § 371 Date: Apr. 14, 1989
  § 102(e) Date: Apr. 14, 1989
[87] PCT Pub. No.: WO89/02545
  PCT Pub. Date: Mar. 23, 1989

[30] Foreign Application Priority Data

Sep. 11, 1987 [JP] Japan .................... 62-139675[U]

[51] Int. Cl.$^5$ ............................................. F16D 13/72
[52] U.S. Cl. ............................ 192/70.12; 192/113 A
[58] Field of Search .................... 192/113 A, 70.12

[56] References Cited

U.S. PATENT DOCUMENTS 4,657,128  4/1987  Fujito et al. ................ 192/70.12 X

FOREIGN PATENT DOCUMENTS 3703663  8/1987  Fed. Rep. of Germany ... 192/113 A
2181193  4/1987  United Kingdom ........... 192/113 A Primary Examiner—Rodney H. Bonck
Attorney, Agent, or Firm—Armstrong, Nikaido, Marmelstein, Kubovcik & Murray

[57] ABSTRACT

A cooling device of a pull type clutch having a diaphragm spring comprising an air induction body for inducing cool air fixed on a face of the diaphragm spring. The induction body including a plurality of air scoops opening toward a rotation direction of the clutch. A plurality of washers and rivets fix the induction body to the diaphragm spring.

2 Claims, 2 Drawing Sheets

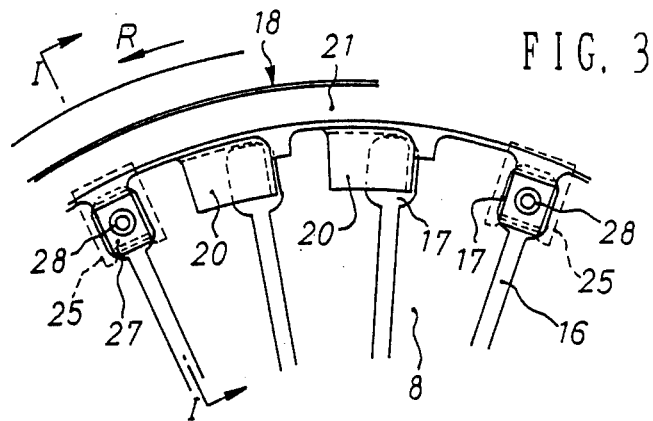
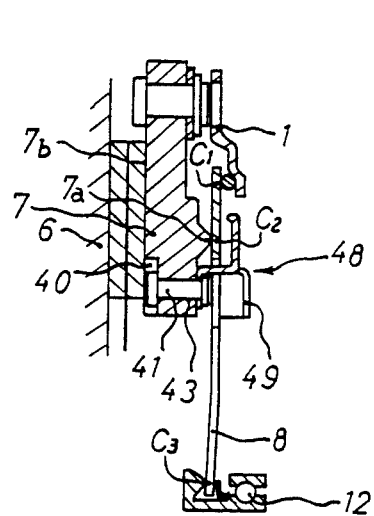
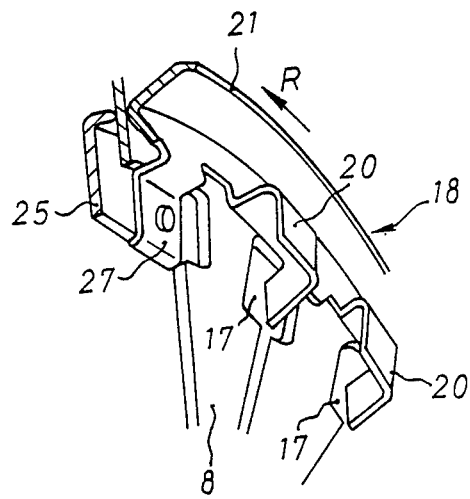

COOLING DEVICE FOR PULL TYPE CLUTCH

TECHNICAL FIELD

The present invention relates to a cooling device for pull type clutch.

BACKGROUND OF THE INVENTION 1. (Prior Art)

In a pull type clutch, such shown in as FIG. 5, an outer fulcrum C1 of a diaphragm spring 8 is supported by a clutch cover 1, an intermediate fulcrum C2 is in contact with a fulcrum land 7a of a pressure plate 7, and an inner fulcrum C3 is engaged with a release bearing 12.

To supply cool air from outside to the pressure plate 7, an air induction body 48 having a plurality of air scoops 49 is provided air is induced to the pressure plate 7 by rotating of the inducing body 48.

However, the induction body 48 is fixed on the pressure plate 7 by means of rivets 41 requiring a plurality of holes 43 in the pressure plate 7 and, at the same time, a plurality of notched seats 40 on the friction face side 7b of the pressure plate 7 and results in a number of disadvantage. The number of steps in the process to manufacture the pressure plate 7 increases, and the edge of the notched seats 40 or the head of the rivets 41 may scratch the facing 6.

2. (Object of the Invention)

The object of the present invention is to solve the above problems by fixing the air induction body to the diaphragm spring.

DISCLOSURE OF THE INVENTION

In order to accomplish the above objects, the clutch of the first embodiment consist of a diaphragm spring having a plurality of slits and enlarged notches at an outer peripheral end of the slits, a clutch cover fixed on a flywheel and connected with an outer fulcrum of the diaphragm spring, a pressure plate movable in an axial direction and connected to a intermediate fulcrum of the diaphragm spring, a release bearing movable in said axial direction and connected to a inner fulcrum of the diaphragm spring for releasing the pressure plate from a clutch disc by pulling the inner fulcrum of the diaphragm spring, a cooling device for clutch, the cooling device comprising a ring portion to induce cool air arranged on a back face of the diaphragm spring, a plurality of air scoops opening toward the rotation side of clutch and formed on the induction body, a plurality of washers arranged on a front face of the diaphragm spring, the washers and the induction body being jointed the each other through the notches of the diaphragm spring, the diaphargm spring being held between said induction body and the washers.

During clutch rotating, the air induction body rotates with the diaphragm spring. Therefore the cool air is scooped from out side (the output side in the axial direction) and is supplied to the pressure plate. The pressure plate is cooled by the cool air.

Moreover, because the induction body is fixed on the diaphragm spring by means of the washers and rivets through the holes of the diaphragm spring, it is not necessary to manufacture any notched seat and/or holes for inserting the rivets therein. Consequently the expenses for manufacturing are reduced. Moreover, because it is not necessary to manufacture any notched seat for the rivets scratching of the facing by the heads of the rivets or the edges of the notched seats is avoided. Therefore, the life of the facing is increased.

In the cooling device of the second embodiment, in addition to the first embodiment, an annular protrusion in contact with the intermediate fulcrum of the diaphragm spring is formed on the induction body, a plurality of protrusions in contact with the intermediate fulcrum of the diaphragm spring are respectively formed on said washers and, the intermediate fulcrum of the diaphragm spring is held between the above protrusions. As a result, the diaphragm spring can move by elastic transformation, and the operation of releasing is smooth.

BRIEF DESCRIPTION OF THE DRAWINGS

FIG. 3 is a section view taken from the direction of the arrow III.

FIG. 4 is a perspective view of the same portion as FIG. 2.

FIG. 5 a longitudinal section view of a conventional device.

MODE FOR CARRYING OUT THE INVENTION (Embodiment)

Figure 1:
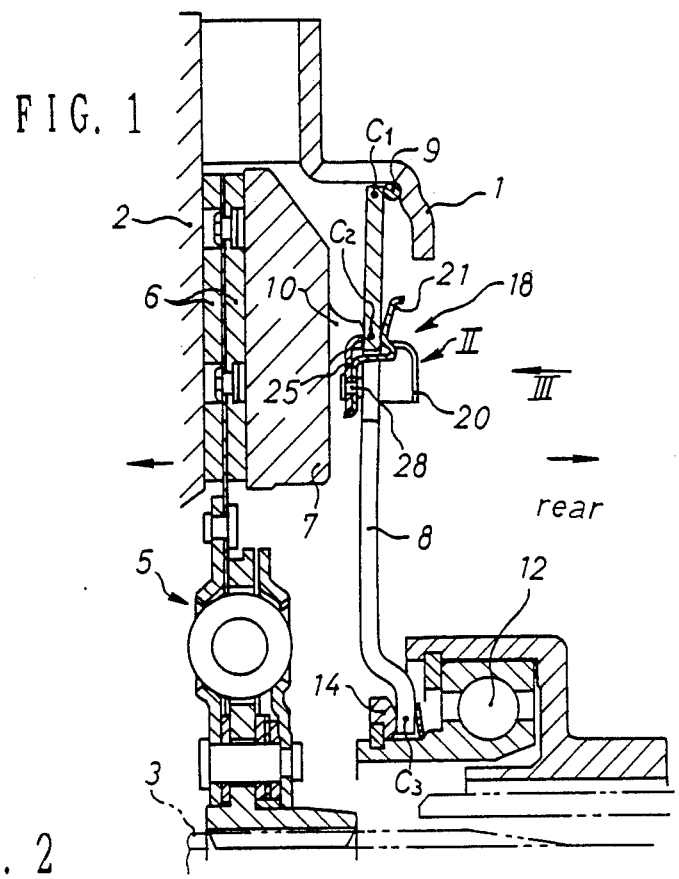
FIG. 1 shows a longitudinal section view of the pull type clutch provided with the cooling device of the present invention.

In FIG. 1 illustrating an embodiment of the pull type clutch of the present invention, a inner splined hub of a clutch disc 5 is in spline engagement with an output shaft 3. Facings 6 are fixed on an outer peripheral face of the clutch disc 5. A flywheel 2 is arranged on the front of the facing 6, and a pressure plate 7 is arranged behind the facings 6. The pressure plate 7 is connected movably in the axial direction on a clutch cover 1 by means of strap plates. The clutch cover 1 is connected to the outer peripheral end of the flywheel 1 and extends backward so that the clutch cover 1 covers the pressure plate 7.

A diaphragm spring 8 is arranged behind the pressure plate 7. Fulcrum C1 of spring 8 is supported on the bending portion of the clutch cover 1 by a wire ring 9. Intermediate fulcrum C2 is connected to the fulcrum land 10 of the pressure plate 7. An inner fulcrum C3 is engaged with a release bearing 12. A plurality of fulcurm lands 10 are arranged the same intervals in the circumferential direction. The clutch is released when the inner peripheral end is pulled backward by the engaging ring 14 of the release bearing 12.

In FIG. 3, showing an enlarged view taken in the direction of the arrow III, the diaphragm spring 8 has a plurality of radial slits 16 and a plurality of enlarged notches 17. An induction body 18 for cool air is fixed to the diaphragm spring 8 at the back face. The air induction body 18 for cooling air has a plurality of connecting members 27 and a plurality of air scoops 20 integrally at the inner side of a ring portion. The connecting members 27 and the airscoops 20 are disposed respectively on places corresponding to the openings 17. For instance, the connecting members 27 are disposed at every third places corresponding to the notches 17, the air scoops 20 are disposed at places corresponding to the opennings 17 which are between the connecting members 27. The air scoops 27 open at the end of rotation direction R and open at the inner peripheral end.

The connecting members 27 are fixed by means of the rivets 28 on the washers 25 which are arranged on the front face of the diaphragm spring 8.

Figure 2:
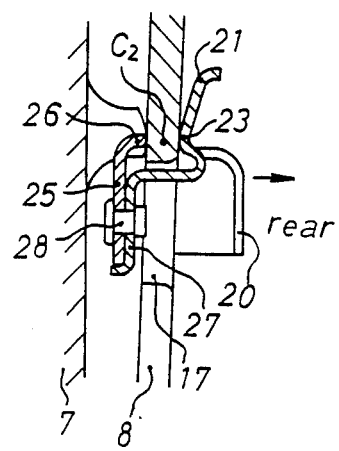
FIG. 2 is enlarged view of the main portion in FIG. 1.

In FIG. 2, showing an enlarged view of II portion, each airscoop 20 extends backward. The inner space of each airscoop 20 goes through the each notch 17 to the pressure plate side (front side).

The ring portion 21 inclines toward the diaphragm spring side from the outer side to the inner side. The inner peripheral annular protrusion 23 is connected with the intermediate fulcrum C2. A sectional figure of each connecting pice 27 is formed as like a L figure and passes through the notch 17 to the front side. The front side of each connecting member 27 is fixed on the washer 25 by means of rivet 28. The outer peripheral end of each washer 25 has a protrusion 26 which bends backward. The protrusions 26 are in contact with the intermediate fulcrum C2 of the diaphragm spring 8. Namely, the intermediate fulcrum C2 is held between both protrusion 23, 26 by combining the washers 25 with the induction body 18 by the rivets 28. Therefore the induction body 18 is fixed on the diaphragm spring 8. The washers 25 are located on the plates between the fulcrum lands 10 in the circumfencial direction.

FIG. 4 is a perspective view of FIG. 2 and shows clearly the airscoops 20.

Function will be described hereunder. During clutch rotation the induction body 8, FIG. 3, rotates in the direction of the arrow R with the diaphragm spring 8 cool air is induced from the openings at rotation side of the scoops 20, an is supplied to the pressure plate 8, FIG. 2, through the notches 17.

Releasing of diaphragm spring 8 is not prevented because the intermediate fulcrum C2 is held between both protrusions 23, 26. Consequently, it becomes possible to obtain a smooth release operating and a life of the diaphragm spring become long.

(Other Embodiments)

(1) The number and arrangment of the connecting members and the airscoops are not limited to the foregoing. They can be selected at will.

(2) The ring body can be divided into two or three members and fixed to the diaphragm spring.

What is claimed is:

1. In a pull-type clutch having a diaphragm spring with a plurality of slits and enlarged notches at outer peripheral ends of said slits,
   a clutch cover fixed on a flywheel and having an outer fulcrum for said diaphragm spring,
   a pressure plate movable in an axial direction and in contact with an intermediate fulcrum of said diaphragm spring,
   a release bearing movable in said axial direction and engaged with an inner fulcrum of said diaphragm spring for releasing the pressure plate from a clutch disc by pulling said inner fulcrum of said diaphragm spring,
   a cooling device for said clutch, said cooling device comprising.
   an air induction body for inducing cooling air mounted on a release bearing face of said diaphragm spring,
   a plurality of air scoops opening in a rotation direction of said clutch and formed on said induction body,
   a plurality of washer arranged on a pressure plate side of said diaphragm spring,
   said washers and said induction body being joined to each other through said notches of said diaphragm spring,
   said diaphragm spring being held between said induction body and said washers.

2. A clutch cooling device as set forth in claim 1, wherein first annular protrusions located at said intermediate fulcrum of said diaphragm spring are formed on said induction body,
   second protrusion in contact with said intermediate fulcrum of said diaphragm spring are formed on said induction body and said intermediate fulcrum of said diaphragm spring is held between said first and second protrusions.

* * * * *